(12) United States Patent
Shimizu et al.

(10) Patent No.: US 7,905,807 B2
(45) Date of Patent: Mar. 15, 2011

(54) HYDRAULIC CONTROL APPARATUS FOR AUTOMATIC TRANSMISSION, AND HYBRID DRIVE SYSTEM PROVIDED WITH THE SAME

(75) Inventors: Tetsuya Shimizu, Anjo (JP); Kazuyuki Noda, Anjo (JP); Kazunori Ishikawa, Anjo (JP); Satoru Kasuya, Anjo (JP); Tooru Matsubara, Toyota (JP); Masahiro Kojima, Okazaki (JP); Ryuji Ibaraki, Nishikano-gun (JP); Atsushi Tabata, Okazaki (JP)

(73) Assignees: Aisin AW Co., Ltd., Anjo (JP); Toyota Jidosha Kabushiki Kaisha, Toyota (JP)

( * ) Notice: Subject to any disclaimer, the term of this patent is extended or adjusted under 35 U.S.C. 154(b) by 620 days.

(21) Appl. No.: 12/003,338

(22) Filed: Dec. 21, 2007

(65) Prior Publication Data

US 2008/0207375 A1   Aug. 28, 2008

(30) Foreign Application Priority Data

Dec. 26, 2006  (JP) .................................. 2006-350308

(51) Int. Cl.
*F16H 3/72* (2006.01)

(52) U.S. Cl. .............................. 475/5; 475/120; 475/122

(58) Field of Classification Search .............. 475/5, 116, 475/120, 122
See application file for complete search history.

(56) References Cited

U.S. PATENT DOCUMENTS

| 4,616,531 | A | * | 10/1986 | Ogasawara et al. | 477/117 |
|---|---|---|---|---|---|
| 5,027,676 | A | * | 7/1991 | Fujiwara et al. | 477/158 |
| 5,038,637 | A | * | 8/1991 | Sugano | 477/150 |
| 5,311,795 | A | * | 5/1994 | Yoshimura et al. | 475/123 |
| 5,803,866 | A | * | 9/1998 | Tsukamoto et al. | 477/132 |
| 7,261,659 | B2 | * | 8/2007 | Raghavan et al. | 475/5 |
| 2002/0025886 | A1 | | 2/2002 | Itou et al. | |

FOREIGN PATENT DOCUMENTS

JP    A-2001-343067    12/2001

* cited by examiner

*Primary Examiner* — Ha D. Ho
(74) *Attorney, Agent, or Firm* — Oliff & Berridge, PLC

(57) ABSTRACT

A hydraulic control apparatus includes a switching device that switches between a hydraulic servo of the plurality of hydraulic servos of the first friction engaging element and a hydraulic servo of the plurality of hydraulic servos of the second friction engaging element so as to supply a control pressure from the one pressure regulating solenoid valve to each of the plurality of hydraulic servos, wherein the switching enables a control of an engagement and disengagement of the first friction engaging element and the second friction engagement element using the one pressure regulating solenoid valve.

16 Claims, 4 Drawing Sheets

FIG.2

|  | C-1 | C-2 | C-3 | B-1 | B-2 | F-1 |
|---|---|---|---|---|---|---|
| P |  |  |  |  |  |  |
| R |  |  | O |  | O |  |
| N |  |  |  |  |  |  |
| 1ST | O |  |  |  | (O) | O |
| 2ND | O |  |  | O |  |  |
| 3RD | O | O |  |  |  |  |
| 4TH |  | O |  | O |  |  |

※(O) DENOTES BEING CARRIED OUT DURING ENGINE BRAKING

HYDRAULIC CONTROL APPARATUS FOR AUTOMATIC TRANSMISSION, AND HYBRID DRIVE SYSTEM PROVIDED WITH THE SAME

INCORPORATION BY REFERENCE

The disclosure of Japanese Patent Application No. 2006-350308 filed on Dec. 26, 2006 including the specification, drawings and abstract is incorporated herein by reference in its entirety.

BACKGROUND OF THE INVENTION

The present invention relates to a hydraulic control apparatus for an automatic transmissions and a hybrid drive system that is provided with the same.

There exists an automatic transmission that is mounted in a vehicle such as an automobile, for example. In the automatic transmission, electronic control controls the engagement pressure that is carried out in order to reduce the engagement shock (shifting shock) of the clutches and brakes during acceleration and clamp shifting. Conventionally, a common hydraulic control apparatus that controls the engagement pressure in this manner is one in which a line pressure or a range pressure is regulated by using a linear solenoid valve and a control valve, and supplied to the hydraulic servo of each of the clutches and brakes (Japanese Patent Application Publication No. JP-A-2001-343067, for example).

SUMMARY OF THE INVENTION

The size of the hydraulic pressure that can be regulated by a linear solenoid valve is insufficient in comparison to the size of the engagement pressure. A structure is thus used in which an engagement pressure, which is supplied to a hydraulic servo, is regulated by adjusting the aperture for a line pressure and a range pressure by controlling the spool position of the control valve using the control pressure of the linear solenoid valve and by controlling the aperture of the control valve.

In recent years, the technical development of linear solenoid valves has progressed, and using the control pressure of a linear solenoid valve as an engagement pressure has become possible. By supplying the control pressure of a linear solenoid valve in this manner directly to a hydraulic servo (that is, without carrying out pressure regulation with other valves), it is possible to eliminate the occurrence of failures (such as the valve stick of a control valve), and to simplify the hydraulic circuit structure in the hydraulic control apparatus. Thus, it is possible to improve reliability, as well as to simplify the manufacturing process.

However, in order to supply the engagement pressures for each of the hydraulic servos directly by using the linear solenoid valve as described above, each of the linear solenoid valves and each of the hydraulic servos must be made to correspond one-to-one. That is, the number of linear solenoid valves provided is equal to the number of hydraulic servos. The linear solenoid valves are expensive in comparison to generally used solenoid valves, and are large due to their capacity to directly regulate the engagement pressure. Thus, in automatic transmissions having a clutch that engages only in the reverse speed, such as the automatic transmission in Japanese Patent Application Publication No. JP-A-2001-343067, there is a problem in that it is necessary to provide a dedicated linear solenoid valve only for the clutch for the reverse speed, which has a low usage frequency. Using a dedicated linear solenoid valve becomes a hindrance to the cost reduction and the downsizing of the hydraulic control apparatus.

The present invention thus provides, among other things, a hydraulic control apparatus for an automatic transmission that can carry out, for example, the control of the engagement and disengagement of a first friction engaging element during forward travel and the control of the engagement and disengagement of a second friction engaging element during reverse travel by using one pressure regulating solenoid valve, and enables cost reductions and downsizing, and a hybrid drive system that is provided with the same.

According to an exemplary aspect, a hydraulic control apparatus for an automatic transmission provided with a first friction engaging element and a second friction engaging element that are capable of supplying a control pressure that is regulated and controlled by one pressure regulating solenoid valve to each of a plurality of hydraulic servos includes a switching device that switches between a hydraulic servo of the plurality of hydraulic servos of the first friction engaging element and a hydraulic servo of the plurality of hydraulic servos of the second friction engaging element so as to supply a control pressure from the one pressure regulating solenoid valve to each of the plurality of hydraulic servos, wherein the switching enables a control of an engagement and disengagement of the first friction engaging element and the second friction engagement element using the one pressure regulating solenoid valve.

BRIEF DESCRIPTION OF THE DRAWINGS

Various exemplary aspects of the invention will be described with reference to the drawings, wherein:

FIG. 2 is an engagement table of an automatic transmission;

DETAILED DESCRIPTION OF THE PREFERRED EMBODIMENT

Below, embodiments according to the present invention will be explained with reference to FIG. 1 through FIG. 4.

Figure 1:
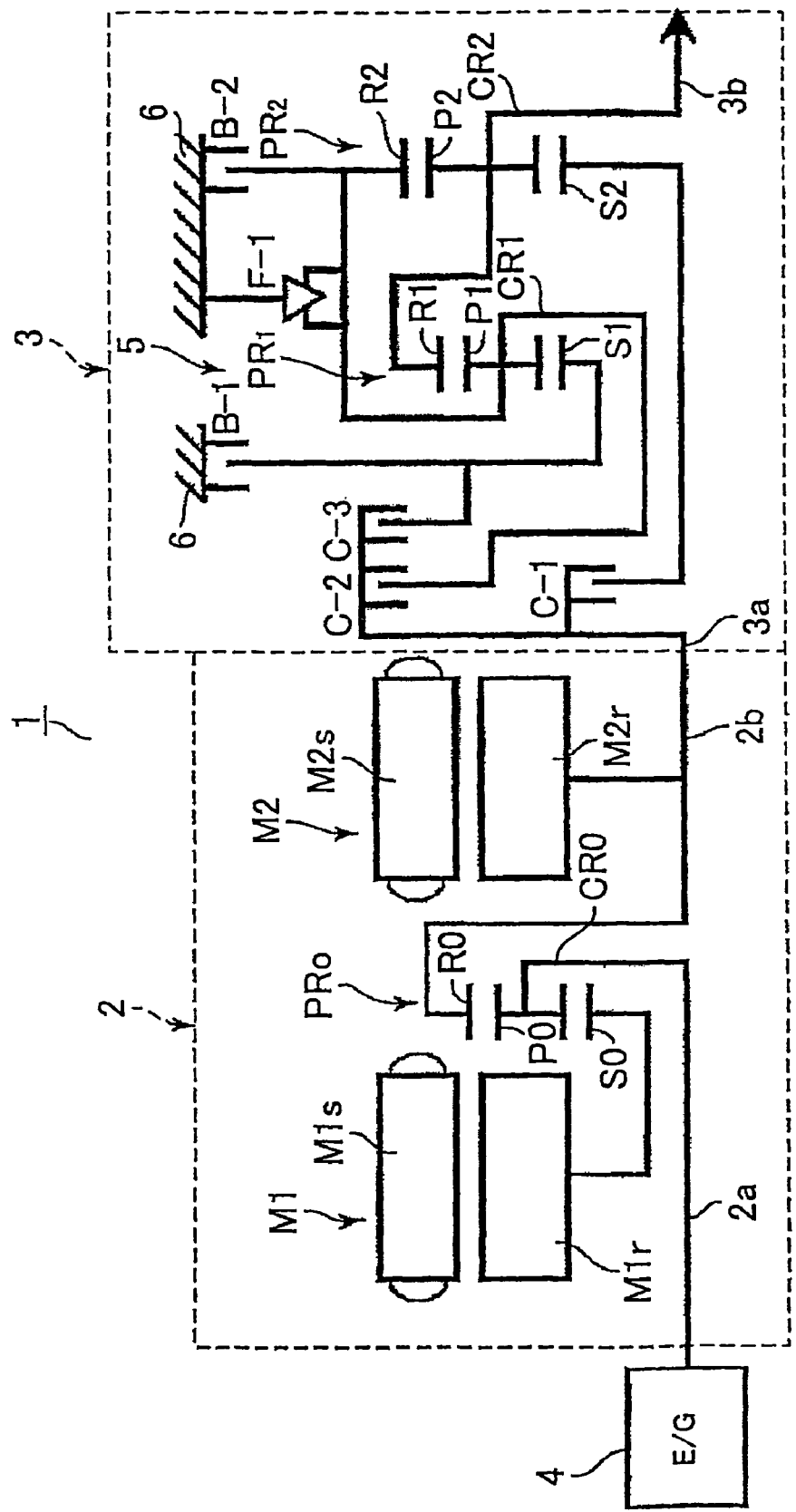
FIG. 1 is a skeleton drawing that shows a hybrid drive system according to the present invention.

As shown in FIG. 1, a hybrid drive system 1 to which the present invention can be applied is broadly structured so as to be provided with a hybrid drive unit 2 that can connect to an internal combustion engine 4, and an automatic transmission 3 that can shift the rotation that is output from the hybrid drive unit 2 to, for example, four forward speeds and one reverse speed.

The hybrid drive unit 2 is what is termed a two-motor series-parallel type, and is structured so as to include an input shaft 2a (for the hybrid drive unit 2) that can be connected to the internal combustion engine 4, a power distributing planetary gear (power distribution mechanism) $PR_O$, a first motor M1 that is provided with a stator M1s and a rotor M1r, a second motor M2 that is provided with a stator M2s and a rotor M2r, and a drive shaft 2b that is connected to the input shaft 3a of the automatic transmission 3, which is to be described below. Note that, in the present embodiment, for the convenience of the explanation, an explanation is provided in which the drive shaft 2b and the input shaft 3a are separate, but the drive shaft 2b and the input shaft 3a are one integrated shaft-shaped member.

The power distribution planetary gear $PR_0$ is structured so as to be provided with a carrier CR0 that supports a pinion P0 so as to be able to rotate freely, a sun gear S0 that meshes with the pinion P0, and a ring gear R0 that similarly meshes with the pinion P0. The input shaft 2a is connected to the carrier CR0, the rotor M1r of the first motor M1 is connected to the sun gear S0, and the drive shaft 2b is connected to the ring gear R0. In addition, the rotor M2r of the second motor M2 is connected to the drive shaft 2b.

In the hybrid drive unit 2 that is structured in this manner, when the drive rotation is input from the internal combustion engine 4 to the input shaft 2a, the drive rotation of the internal combustion engine 4 is transferred to the carrier CR0. Some of the drive power of the drive rotation that has been transferred to the carrier CR0 is distributed from the sun gear S0 to the first motor M1 that suitably carries out regenerative braking control that depends on the throttle opening degree where the regenerative braking power becomes a reactive force. The remaining drive power of the drive rotation that has been transferred to the carrier CR0 is distributed to the ring gear R0 and output to the drive shaft 2b.

In addition, the drive power (energy) that is regenerated by the first motor M1 charges a battery (not illustrated), and is used for the drive power of the second motor M2 as appropriate. Specifically, the second motor M2 contributes drive power to the drive shaft 2b as appropriate depending on the throttle opening degree and the like (suitably regenerated during engine braking). The drive power that has been distributed in the planetary gear $PR_0$ from the internal combustion engine 4 and the drive power of the second motor M2 are merged and the result is output from the drive shaft 2b.

Note that the speed of the drive shaft 2b at this time is a speed that is based on the gear ratio in the power distribution planetary gear $PR_0$, which depends on the speed of the internal combustion engine 4 and the speed the first motor M1, and the rotation of this drive shaft 2b serves as the input rotation that is input to the input shaft 3a of the automatic transmission 3.

In addition, while the internal combustion engine 4 is stopped, the drive shaft 2b is suitably driven (regenerated during engine braking as appropriate) by the second motor M2 depending on the throttle opening degree and the like. That is, only the drive power of the second motor M2 is input to the input shaft 3a of the automatic transmission 3. At this time, the motor M1 is in an idle state, and the transfer of rotation is not carried out on the internal combustion engine 4.

Next, the automatic transmission 3 will be explained. The automatic transmission 3 is provided with an automatic shifting mechanism 5 inside a case (transmission case) 6, and this automatic shifting mechanism 5 is structured so as to include the input shaft 3a that is connected to the drive shaft 2b of the hybrid drive unit 2 and the output shaft 3b that is connected to the drive wheels (not illustrated). At the same time, coaxial to the input shaft 3a and the output shaft 3b, the automatic shifting mechanism 5 includes first through third clutches C-1, C-2, and C-3, first and second brakes B-1 and B-2, a one-way clutch F-1, a first planetary gear (speed change gear mechanism) $PR_1$, and a second planetary gear (speed change gear mechanism) $PR_2$, and the like.

The first planetary gear $PR_1$ includes a single pinion planetary gear that is provided with a carrier CR1 that supports a pinion P1 so as to rotate freely, and a sun gear S1 and a ring gear R1 that each mesh with the pinion P1. In addition, similarly, the second planetary gear $PR_2$ also includes a single pinion planetary gear that is provided with a carrier CR2 that supports a pinion P2 so as to rotate freely, and a sun gear S2 and a ring gear R2 that each mesh with the pinion P2.

The sun gear S2 of the second planetary gear $PR_2$ is connected to the first clutch C-1, and the rotation of the input shaft 3a is input by the engagement of this first clutch C-1. In contrast, the sun gear S1 of the first planetary gear $PR_1$ is connected to the third clutch (second friction engaging element) C-3 and connected to the first brake B-1, and the rotation of the input shaft 3a is input by the engagement of the third clutch C-1. In addition, the rotation with respect to the case 6 is locked by the engagement of the first brake B-1.

The carrier CR1 of the first planetary gear $PR_1$ is rotationally linked to the ring gear R2 of the second planetary gear $PR_2$, and at the same time, connected to the second clutch C-2, and the rotation of the input shaft 3a is input by the engagement of the second clutch C-2. In addition, the carrier CR1 and the ring gear R2 are restricted to one-directional rotation with respect to the case 6 by the one-way clutch F-1, and at the same time, are connected to the second brake (first friction engaging element) B-2, and the rotation with respect to the case 6 is locked by the engagement of the second brake B-2. In addition, the ring gear R1 of the first planetary gear $PR_1$ is rotationally linked to the carrier CR2 of the second planetary gear $PR_2$, and at the same time, connected to the output shaft 3b.

Figure 3:
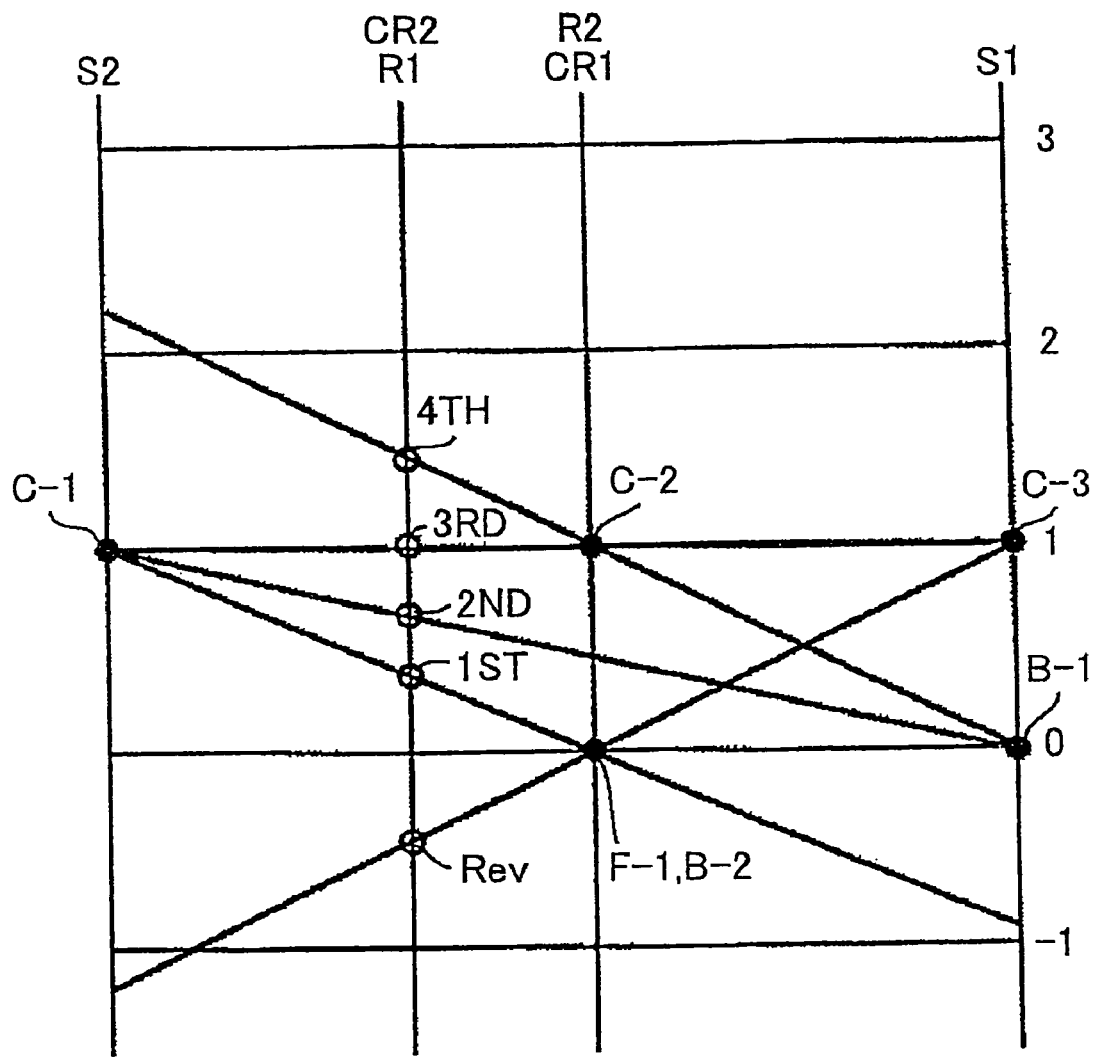
FIG. 3 is a velocity diagram of the automatic transmission.

Next, the operation of the automatic transmission 3 will be explained with reference to FIG. 2 and FIG. 3, while referring to FIG. 1.

In the D (drive) range, for example, as shown in FIG. 2, in the first forward speed (1st), the first clutch C-1 and the one-way clutch F-1 are engaged. Thereby, as shown in FIG. 1 and FIG. 3, the input rotation of the input shaft 3a (the drive rotation of the drive shaft 2b of the hybrid drive unit 2) is input to the sun gear S2 via the first clutch C-1. In addition, the rotation of the ring gear R2 is restricted to one direction, that is, the reverse rotation of the ring gear R2 is prevented and the rotation thereof is held stationary. Thereby, the rotation of the carrier CR2 is reduced to serve as the first forward speed due to the input rotation that is input to the sun gear S2 and the ring gear R2 that is held stationary, and the reduced rotation of the first forward speed is output from the output shaft 3b.

In addition, during engine braking (i.e., during coasting), the state of the first forward speed is maintained by locking the brake B-2, holding the ring gear R2 stationary, and preventing the positive rotation of the ring gear R2. Note that in the first forward speed, because the reverse rotation of the second carrier CR2 is prevented by the one-way clutch F-1 and the positive rotation is enabled, the establishment of the first forward speed when switching, for example, from a non-travel range to a travel range can be carried out more smoothly by the automatic engagement of the one-way clutch F-1.

In the second forward speed (2nd), as shown in FIG. 2, the first clutch C-1 and the first brake B-1 are engaged. Thereby, as shown in FIG. 1 and FIG. 3, the input rotation of the input shaft 3a is input to the sun gear S2 via the first clutch C-1. In addition, the rotation of the sun gear S1 is held stationary by the first brake B-1. Thereby, the rotation of the carrier CR2 and the ring gear R1 is reduced by the input rotation that has been input by the sun gear S2, and at the same time, the rotation of the carrier CR1 and the ring gear R2 is reduced more than that of the reduced rotation of the carrier CR2 and the ring gear R1 based on the reduced rotation of the ring gear R1 and the stationary sun gear S1. In addition, the rotation of the carrier CR2 is reduced to serve as the second forward speed due to the reduced rotation of the ring gear R2 and the input rotation of the sun gear S2, and the reduced rotation of the second forward speed is output to the output shaft 3*b*.

In the third forward speed (3rd), as shown in FIG. 2, the first clutch C-1 and the second clutch C-2 are engaged. Thereby, as shown in FIG. 1 and FIG. 3, the input rotation of the input shaft 3*a* is input to the sun gear S2 via the first clutch C-1, and at the same time, the input rotation is input to the carrier gear CR1 and the ring gear R2 via the second clutch C-2. Thereby, the second planetary gear $PR_2$ is directly linked due to the input rotation that is input to the sun gear S2 and the ring gear R2, the carrier CR2 is a directly linked rotation that serves as the third forward speed, and the positive rotation of the third forward speed is output from the output shaft 3*b*.

In the fourth forward speed (4th), as shown in FIG. 2, the second clutch C-2 and the first brake B-1 are engaged. Thereby, as shown in FIG. 1 and FIG. 3, the input rotation of the input shaft 3*a* is input to the carrier CR1 via the second clutch C-2. In addition, the rotation of the sun gear S1 is held stationary by the first brake B-1. Thereby, the rotation of the ring gear R1 is increased to serve as the fourth forward speed by the input rotation that is input by the carrier CR1 and the stationary sun gear S1, and the increased rotation of the fourth forward speed is output from the output shaft 3*b* via the carrier CR2.

In reverse speed (Rev), as shown in FIG. 2, the third clutch C-3 and the second brake B-2 are engaged. Thereby, as shown in FIG. 1 and FIG. 3, the input rotation of the input shaft 3*a* is input to the sun gear S1 via the third clutch C-3. In addition, the rotation of the carrier CR1 is held stationary by the second brake B-2. Thereby, the rotation of the ring gear R1 is reversed due to the input rotation that is input by the sun gear S1 and the carrier CR1 that is held stationary, and the reverse rotation, which serves as the reverse speed, is output from the output shaft 3*b* via the carrier CR2.

Note that, in the P (parking) range and the N (neutral) range, the first clutch C-1, the second clutch C-2, and the third clutch C-3 are disengaged. Thereby, the input shaft 3*a* is cut off from the first planetary gear $PR_1$ and the second planetary gear $PR_2$, that is, the power transfer between the input shaft 3*a* and the output shaft 3*b* is cut off.

In the automatic transmission 3 of the hybrid drive system 1 having the structure that has been described above, the shift control is carried out by controlling the engagement and disengagement of the first through third clutches C-1, C-2, and C-3, and the first and second brakes B-1 and B-2 by using the hydraulic control apparatus. Below, a hydraulic control apparatus 10 of the automatic transmission 3 will be explained with reference to FIG. 4.

Figure 4:
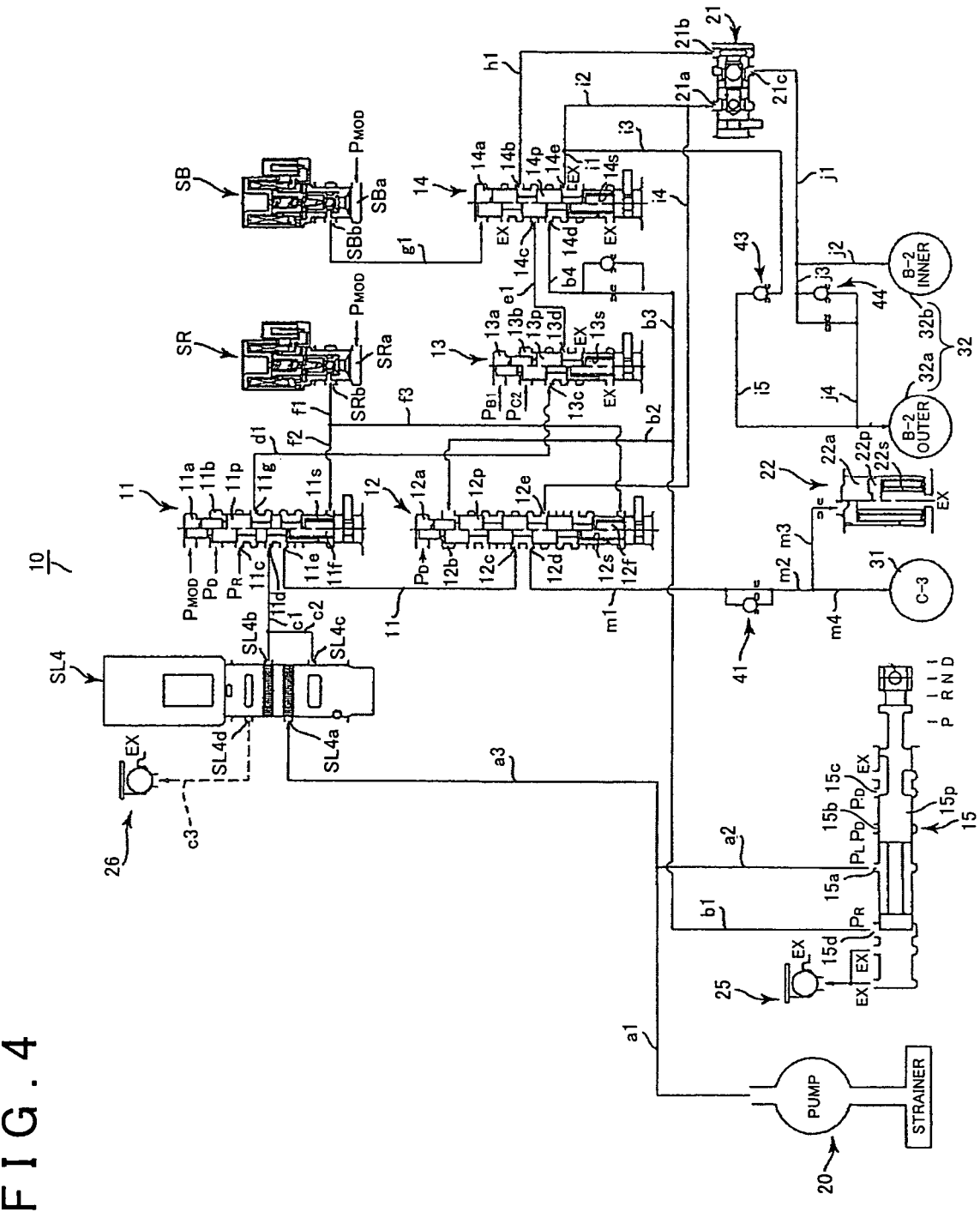
FIG. 4 is a schematic drawing that shows a hydraulic control apparatus for the automatic transmission according to the present invention.

Note that FIG. 4 shows some of the components of the hydraulic control apparatus 10, with the actual hydraulic control system 10 being provided with many other valves, oil paths, and the like. The hydraulic control apparatus 10 according to the present invention is provided with three linear solenoid valves (SL1 to SL3, not illustrated) that respectively directly supply control pressure to a hydraulic servo of the first clutch C-1, a hydraulic servo of the second clutch C-2, and a hydraulic servo of the first brake B-1 (the hydraulic servos are not illustrated, and the control of the engagement and disengagement of the first clutch C-1, second clutch C-2, and the first brake B-1 is carried out by the respective linear solenoid valves). However, in the following explanation, the explanation of the portions related to the third clutch C-3, the second brake B-2, and the linear solenoid valve SL4, according to the present invention, will be emphasized.

As shown in FIG. 4, the hydraulic control apparatus 10 is provided with an electrical oil pump 20 that is actuated, for example, when the ignition is turned ON. This oil pump 20 is connected to an oil path a1, and hydraulic pressure is constantly supplied to the oil path a1 at least during travel. A primary regulator valve (not illustrated) is connected to the oil path a1, and the hydraulic pressure inside the oil path a1 is regulated by the line pressure $P_L$ depending on the throttle opening degree. Note that, as an oil pump, in addition to the electric oil pump 20, a mechanical oil pump that is driven by being linked to the internal combustion engine 4 may be provided in parallel.

The oil path a1 is connected to an input port 15*a* of a manual valve 15 via an oil path a2, that is, the line pressure $P_L$ is input to an input port 15*a*. This manual valve (switching device, range switching valve) 15 includes a spool 15*p*, and the spool 15*p* is mechanically or electrically linked to a shift lever (shift operating device) that is positioned at the driver's seat (not illustrated) for carrying out the operation of selecting the shift position (P, R, N, and D positions), and is moved toward the left and right directions in the figure.

In addition, the manual valve 15 includes output ports 15*b* and 15*c* that communicate with the input port 15*a* when the spool 15*p* is in the D range position due to a shift lever operation, that is, while in the D range, a line pressure $P_L$ is output from the output ports 15*b* and 15*c* as a forward travel range pressure $P_D$. This forward travel range pressure $P_D$ is supplied to a hydraulic oil chamber 11*b* of a C3B2 relay valve 11 and a hydraulic oil chamber 12*a* of a C3 relay valve 12, both of which will be explained in detail below, via an oil path (not illustrated).

Furthermore, the manual valve 15 includes an output port 15*d* that communicates with the input port 15*a* when the spool 15*p* is in the R range position due to a shift lever operation, and this output port 15*d* is connected to oil paths b1, b2, b3, and b4. While in the R range, the line pressure $P_L$ is output from the output port 15*d* to the oil paths b1, b2, b3 and b4 as the reverse travel range pressure $P_R$. In addition, this reverse travel range pressure $P_R$ is also supplied to a port 11*c* of the C3B2 relay valve 11, which will be explained in detail below, via an oil path (not illustrated).

Note that when the forward travel range pressure $P_D$ and the reverse pressure $P_R$ are not output, in particular, while in the P range and the N range, the space between the input port 15*a* and the other output ports 15*b*, 15*c* and 15*d* is blocked by the spool 15*p*, and the output ports 15*b*, 15*c*, and 15*d* communicate with a drain port EX, and the forward travel range pressure $P_D$ and the reverse travel range pressure $P_D$ are drained (discharged).

In addition, the drain port EX for the reverse travel range pressure $P_R$ is connected to a check ball valve 25, complete discharge of the oil inside the oil paths b1, b2, b3, and b4 is prevented, and it is possible to quickly establish the supply of the reverse travel range pressure $P_R$ for the next time. Note that a similar check ball valve (not illustrated) is also connected to the drain port EX for the forward travel range pressure $P_D$, and similarly it is possible to quickly establish the supply of the forward travel range pressure $P_D$ for the next time.

In addition, the oil path a1 is connected to an input port SL4*a* of the linear solenoid valve SL4 via an oil path a3, that is, the line pressure $P_L$, which serves as the original pressure, is input to the linear solenoid valve SL4. This linear solenoid valve SL4 is structured so as to include a spool (not illustrated), the input port SL4*a*, an output port SL4*b* that is connected to an oil path c1, a feedback oil chamber SL4*c* that inputs feedback pressure from the oil path c1 via an oil path c2, and a drain port SL4*d* that is connected to an oil path c3.

The linear solenoid valve (the one pressure regulating solenoid valve) SL4 is a normally-closed valve. When the solenoid valve is not energized, the communication between the input port SL4a and the output port SL4b is blocked by the spool, and the communication between the output port SL4b and the drain port SL4d is established. The spool is moved depending on the strength of the conducted current, and the communication between the output port SL4b and the drain port SL4d is gradually blocked, and at the same time, the communication between the input port SL4a and the output port SL4b is gradually established. Thus, feedback control is carried out by using the feedback pressure that is input to the feedback oil chamber SL4c, and the line pressure $P_L$ of the input port SL4a is regulated and output from the output port SL4b as the control pressure $P_{SL4}$.

Note that the check ball valve 26 is connected to the drain port SL4d of the linear solenoid valve SL4, the oil in the oil paths c1, c2, and c3 and the like is prevented from being completely discharged, and it is possible to establish the supply of the control pressure $P_{SL4}$ quickly.

In contrast, the solenoid valve (switching device, signal solenoid valve) SR is structured by including an input port SRa that inputs the modulating pressure $P_{MOD}$ from the modulator valve (not illustrated in the figures) and an output port SRb that is connected to oil paths f1, f2, and f3. Note that the modulator valve is a valve that inputs the line pressure $P_L$ of the oil path a1 by being connected, for example, to the oil path a1, and outputs line pressure $P_L$ as a constant modulating pressure $P_{MOD}$ based on the urging force of a spring that urges the spool and the feedback pressure when the line pressure $P_L$, which increases based on the throttle opening degree, becomes equal to or greater than a predetermined pressure.

The solenoid valve SR is, for example, a three-way normally-closed valve. When the solenoid valve SR is not energized, the communication between the input port SRa and the output port SRb is blocked, and when it is energized, the communication between the input port SRa and the output port SRb is established, and the signal pressure $P_{SR}$ from the output port SRb is output to the oil paths f1, f2, and f3.

In addition, similarly, the solenoid valve SB is structured by including an input port SBa that inputs a modulating pressure $P_{MOD}$ from a modulator valve (not illustrated) and an output port SBb that is connected to an oil path g1, and is structured by, for example, a three-way normally-closed valve. When the solenoid valve SB is not energized, the communication between the input port SBa and the output port SBb is blocked, and when energized, the communication between the input port SBa and the output port SBb is established, and the signal pressure $P_{SB}$ from the output port SBb is output to the oil path g1.

The C3B2 relay valve (switching device, first switching valve) 11 is structured by including a spool 11p, a spring 11s that urges the spool 11p in one direction (toward the upper side in FIG. 4), a hydraulic oil chamber 11a to which the modulating pressure $P_{MOD}$ is input, a hydraulic oil chamber 11b to which the forward travel range pressure $P_D$ from the output ports 15b and 15c of the manual valve 15 is input, an input port 11c to which the reverse travel range pressure $P_R$ from the output port 15d of the manual valve 15 is input, an input port 11d to which the control pressure $P_{SL4}$ from the output port SL4b of the linear solenoid valve SL4 is input via the oil path c1, an output port 11e that is connected to the oil path 11, an output port 11g that is connected to an oil path d1, and a hydraulic oil chamber 1 if to which the signal pressure $P_{SR}$ of the solenoid valve SR is input via the oil path f2.

In the C3B2 relay valve 11, when, for example, the line pressure $P_L$ is generated due to turning the ignition ON, the modulating pressure $P_{MOD}$ is input to the hydraulic oil chamber 11a, the urging force of the spring 11s is overcome, and the spool 11p moves to the position that is shown on the right half in FIG. 4 (below, referred to as the "right-half position"). When the right-half position is reached, the input port 11d and the output port 11g are communicated, that is, the control pressure $P_{SL4}$ of the linear solenoid valve SL4 that is supplied to the oil path c1 can be supplied to the oil path d1.

In addition, the C3B2 relay valve 11, when the signal pressure $P_{SR}$ is input to the hydraulic oil chamber 11f while the spool 11p is in the right-half position, the urging force of the spring 11s and the signal pressure $P_{SR}$ of the hydraulic oil chamber 11f overcome the modulating pressure $P_{MOD}$ of the hydraulic oil chamber 11a, and the spool 11p moves to the position that is shown at the left-half in FIG. 4 (below, referred to as the "left-half position"). When the spool 11p is in the left-half position, the input port 11c and the output port 11g are communicated, and the input port 11d and the output port 11e are communicated, that is, the reverse travel range pressure $P_R$ from the manual valve 15 can be supplied to the oil path d1, and at the same time, the control pressure $P_{SL4}$ of the linear solenoid valve SL4, which is supplied to the oil path c1, can be supplied to the oil path d1.

In addition, when the forward travel range pressure $P_D$ is input to the hydraulic oil chamber 11b, the C3B2 relay valve 11 moves from the left-half position to the right half-position, which has been described above, due to the modulating pressure $P_{MOD}$ of the hydraulic oil chamber 11a and the forward travel range pressure $P_D$ of the hydraulic oil chamber 11b overcoming the urging force (and the signal pressure $P_{SR}$ of the hydraulic oil chamber 11f (when the signal pressure $P_{SR}$ has been input)) of the spring 11s, irrespective of the input state of the signal pressure $P_{SR}$ of the hydraulic oil chamber 11f.

The C3 relay valve (second switching valve) 12 is structured so as to include a spool 12p, a spring 12s that urges the spool 12p in one direction (toward the upper side in FIG. 4), a hydraulic oil chamber 12a to which the forward travel range pressure $P_D$ from the output ports 15b and 15c of the manual valve 15 is input, a hydraulic oil chamber (second hydraulic oil chamber) 12b to which the reverse travel range pressure $P_R$ from the output port 15d of the manual valve 15 is input, an input port 12c to which the control pressure $P_{SL4}$ from the linear solenoid valve SL4 is input via the oil path 11, an output port 12d that is connected to an oil path m1, an input port 12e to which the reverse travel range pressure $P_R$ of the oil path b4 is input via oil paths i4, i2, and i1, and a B2 relay valve 14, all of which will be explained in detail below, and a hydraulic oil chamber (first hydraulic oil chamber) 12f, to which the signal pressure $P_{SR}$ of the solenoid valve SR is input via the oil path f3.

In the C3 relay valve 12, when the forward travel range pressure $P_D$ is input to the hydraulic oil chamber 12a or the reverse travel range pressure $P_R$ is input to the hydraulic oil chamber 12b, the urging force of the spring 12s is overcome, and the spool 12p moves to the right-half position. When the spool 12p has moved to the right-half position, the input port 12c and the output port 12d are blocked, and at the same time, the input port 12e and the output port 12d are communicated, that is, the reverse travel range pressure $P_R$, which is supplied to the oil path i4 via the B2 relay valve 14 described below, can be supplied to the oil path m1.

In addition, the C3 relay valve 12 moves to the left-half position by overcoming the urging pressure of the spring 12s and the signal pressure $P_{SR}$ of the hydraulic oil chamber 12f when the signal pressure $P_{SR}$ is input to the hydraulic oil chamber 12f, irrespective of the input state of the forward travel range pressure $P_D$ of the hydraulic oil chamber 12a or the input state of the reverse travel range pressure $P_R$ of the hydraulic oil chamber 12b. When the C3 relay valve 12 has moved to the left-half position, the input port 12e and the output port 12d are blocked, and at the same time, the input port 12c and the output port 12d are communicated, that is, the control pressure $P_{SL4}$ of the linear solenoid valve SL4 can be supplied to the oil path m1 via the oil path 11.

The oil path m1 that is connected to the output port 12d of the C3 relay valve 12 communicates with oil paths m2, m3, and m4, and is connected to a damper 22 via the oil path m3, and at the same time, it is connected to a hydraulic servo 31 of the third clutch C-3. In addition, a structure is used in which a check ball 41 is interposed between the oil path m1 and the oil path m2, and the drain speed becomes faster in proportion to the supply speed to the hydraulic servo 31 of the third clutch C-3.

In addition, the damper 22 is structured so as to include an oil chamber 22a, a spring 22s, and a piston 22p that is urged in the direction toward the oil chamber 22a by the spring 22s, and decreases the pulsation of the oil pressure of the oil paths m2, m3, and m4. That is, reduces the pulsation of the engagement pressure $P_{C3}$ (specifically, the control pressure $P_{SL4}$ and the reverse travel range pressure $P_R$) that is supplied to the hydraulic servo 31 of the third clutch C-3.

In addition, a B2 cut-off valve 13 is structured so as to include a spool 13p, a spring 13s that urges the spool 13p in one direction (toward the upper side in FIG. 4), a hydraulic oil chamber 13a to which the engagement pressure $P_{B1}$ from the hydraulic servo of the first brake B-1 (not illustrated) is input, a hydraulic oil chamber 13b to which the engagement pressure $P_{C2}$ from the hydraulic servo of the second clutch C-2 (not illustrated) is similarly input, an input port 13c that is connected to the oil path d1, and an output port 13d that is connected to an oil path e1.

The B2 cut-off valve 13 is moved to the right-half position by overcoming the urging force of the spring 13s when the engagement pressure $P_{B1}$ is input to the hydraulic oil chamber 13a or the engagement pressure $P_{C2}$ is input to the hydraulic oil chamber 13b. When the B2 cut-off valve 13 reaches the right-half position, the input port 13c and the output port 13d are blocked, that is, the control pressure $P_{SL4}$ of the linear solenoid valve SL4, which is supplied from the oil path d1, or the reverse travel range pressure $P_R$ is blocked.

In addition, the B2 cut-off valve 13 moves to the left-half position due to the urging force of the spring 13s when neither the engagement pressure $P_{B1}$ nor the engagement pressure $P_{C2}$ is input to the hydraulic oil chamber 13a and the hydraulic oil chamber 13b. When the B2 cut-off valve 13 moves to the left-half position, the input port 13c and the output port 13d are communicated, that is, the control pressure $P_{SL4}$ of the linear solenoid valve SL4, which is supplied via the oil path d1, or the reverse travel range pressure $P_R$ is supplied to the oil path e1.

The B2 relay valve 14 is structured so as to include a spool 14p, a spring 14s that urges the spool 14p in one direction (toward the upper side in FIG. 4), a hydraulic oil chamber 14a to which the signal pressure $P_{SB}$ from the output port SBb of the solenoid valve SB is input, an output port 14b that is connected to an oil path h1, an input port 14c that is connected to the oil path e1, an input port 14d to which the reverse travel range pressure $P_R$ is input via the oil path b4, and an output port 14e that is connected to the oil path i1.

The B2 relay valve 14 moves to the right-half position by overcoming the urging force of the spring 14s when the signal pressure $P_{SB}$ is input to the hydraulic oil chamber 14a. When the B2 relay valve 14 reaches the right-half position, the input part 14c and the output port 14b are communicated, and the output port 14e and the drain port EX are communicated, that is, the control pressure $P_{SL4}$ of the linear solenoid valve SL4, which is supplied from the oil path e1, or the reverse travel range pressure $P_R$ is supplied to the oil path h1, and at the same time, the oil pressure of the oil path i1 (and the oil paths i2, i3, and i4) is drained.

In addition, the B2 relay valve 14 moves to the left-half position due to the urging force of the spring 14s when the signal pressure $P_{SB}$ is not input to the hydraulic oil chamber 14a. When the B2 relay valve 14 moves to the left-half position, the input port 14c is blocked, and at the same time, the reverse travel range pressure $P_R$ is supplied to the oil path i1 via the oil path b4.

The oil path h1 is connected to an input port 21b of a check valve 21, and the oil path i1 is connected to an input port 21a of the check valve 21 via the oil path i2. The check valve 21 includes the input port 21a, and the input port 21b, and an output port 21c that is connected to an oil path j1. The higher oil pressure between the oil pressure in the oil path i2 and the oil pressure in the oil path h1 is output from the output port 21c to the oil path j1, and the communication between the port having the lower oil pressure (21a or 21b) and the output port 21c is blocked. Note that the oil path i4 is connected to the oil path i2, and the oil path i4 is connected to the input port 12e of the C3 relay valve 12. In addition, the oil path i3 is connected to the oil path i5 via a check ball valve 43, that is, the reverse flow of oil pressure from the oil path i5 to the oil path i3 is prevented.

A hydraulic servo 32 of the second brake B-2 is what is referred to as a double piston-type hydraulic servo, and includes a B-2 outer oil chamber 32a and a B-2 inner oil chamber 32b. The B-2 outer oil chamber 32a is connected to the oil path i5, the B-2 inner oil chamber 32b is connected to the oil path j2, and then connected to the oil path j1. In addition, the oil path j2 and the oil path i5 are connected by the oil path j3, the check ball valve 44, and the oil path j4. The check ball valve 44 serves to always prevent the oil pressure of the oil path j4 from becoming higher than the oil pressure of the oil path j3. That is, the check ball valve 44 prevents the oil pressure of the B-2 outer oil chamber 32a from becoming higher than the oil pressure of the B-2 inner oil chamber 32b, and a partition wall (not illustrated) that separates between the B-2 outer oil chamber 32a and the B-2 inner oil chamber 32b is thereby prevented from moving.

Next, the operation of the hydraulic control apparatus 10 will be explained based on the structure that has been explained above.

A driver carries out the operation of selecting the D range by using the shift lever and the spool 15p of the manual valve 15 is moved to the D range position, and when engine braking (non-driven state) using the first forward speed (1st) is identified by a control unit (ECU; not illustrated), the solenoid valve SR is turned OFF and the solenoid valve SB is turned on by an electronic command from the control unit.

Thus, the C3B2 relay valve 11 is moved to the right-half position because the modulating pressure $P_{MOD}$ is input to the hydraulic oil chamber 11a, the forward travel range pressure $P_D$ is input to the hydraulic oil chamber 11b, and the signal pressure $P_{SR}$ is input to the hydraulic oil chamber 11f. In addition, in the first forward speed, the second clutch C-2 and the first brake B-1 are not engaged, that is, the engagement pressure $P_{B1}$ and the engagement pressure $P_{C2}$ are not generated, and thus the B2 cut-off valve 13 is moved to the left-half position. Furthermore, the B2 relay valve 14 moves to the right-half position because the signal pressure $P_{SB}$ is input to the hydraulic oil chamber 14a. Note that the C3 relay valve 12 moves to the right-half position because the forward travel range pressure $P_D$ is input to the hydraulic oil chamber 12a and the signal pressure $P_{SR}$ is not input to the hydraulic oil chamber 12f.

From this state, the drive control of the linear solenoid valve SL4 is carried out by the control unit, and when the control pressure $P_{SL4}$ is output from the output port SL4b to the oil path c1, the control pressure $P_{SL4}$ from the output port 11g of the C3B2 relay valve 11 is supplied to the B-2 inner oil chamber 32b via the oil paths d1, e1, h1, j1, and j2, and the second brake B-2 is engaged. Note that the oil path i5 and the oil path i3 are blocked by the check ball valve 43, and thus control oil $P_{SL4}$ is gradually supplied also to the B-2 outer oil chamber 32a.

Subsequently, when the positive drive state of the first forward speed is identified by the control unit (when the engine braking state is no longer in effect), the solenoid valve SB is turned off by an electronic command from the control unit and the B2 relay valve 14 moves to the left-half position because the control pressure $P_{SB}$ is no longer input to the hydraulic oil chamber 14a. Thus, the hydraulic pressure of the B-2 outer oil chamber 32a and the B-2 inner oil chamber 32b is discharged from the drain port EX of the B2 relay valve 14 via the oil paths j4, j3, j2, j1, and h1, and the second brake B-2 is disengaged.

Note that in the second forward speed to the fourth forward speed, at least one of the first brake B-1 and the second brake C-2 is engaged, and thus the B2 cut-off valve 13 moves to the right-half position, the communication between the oil path d1 and the oil path e1 is blocked, and at the same time the oil path e1 is communicated with the drain port EX. Thus, the control pressure $P_{SL4}$ from the linear solenoid valve SL4 is not supplied to the B-2 outer oil chamber 32a and the B-2 inner oil chamber 32b, and this oil pressure is drained. In addition, even if, for example, the first brake B-1 and the second clutch C-2 are engaged during the engine braking of the first forward speed due to some sort of failure, the second brake B-2 is prevented from engaging simultaneously with the first brake B-1 and the second clutch C-2, that is, the stall state of the automatic transmission 3 is prevented.

In addition, in the first forward speed, for example, when the linear solenoid valve SL4 has failed and the control pressure $P_{SL4}$ is not output, the second brake B-2 cannot be engaged. However, because the positive drive state is ensured by the one-way clutch F-1, as has been described above, this is sufficient as a limp home function.

Furthermore, in the first forward speed, for example, even if the solenoid valve SR is electrically damaged by a severed wire or the like, it remains in the OFF state (a non-energized state), and the C3B2 relay valve 11 remains in the right-half position. Thus, even if the solenoid valve SR cannot be driven, it is possible to establish engine braking (due to being structured such that the C3B2 relay valve 11 switches to the left-half position when the solenoid valve SR is turned ON).

In contrast, when the driver carries out an operation to select the R range by using the shift lever and the spool 15p of the manual valve 15 is set in the R range position, a reverse speed (REV) is identified by the control unit (ECU; not illustrated), and then the solenoid valve SR is turned ON and the solenoid valve SB is turned OFF by electronic commands from the control unit.

Thereby, the C3B2 relay valve 11 is set in the left-half position because, although the modulating pressure $P_{MOD}$ is input to the hydraulic oil chamber 11a, the forward travel range pressure $P_D$ is not input to the hydraulic oil chamber 11b and the signal pressure $P_{SR}$ is input to the hydraulic oil chamber 11f. In addition, the C3 relay valve 12 is set in the left-half position because the forward travel range pressure $P_D$ is not input to the hydraulic oil chamber 12a and the signal pressure $P_{SR}$ is input to the hydraulic oil chamber 12f. In addition, even in the reverse speed, because the second clutch C-2 and the first brake B-1 are not engaged, that is, the engagement pressure $P_{B1}$ and the engagement pressure $P_{C2}$ are not generated, the B2 cut-off valve 13 is set in the left-half position. Furthermore, the B2 relay valve 14 is set in the right-half position because the signal pressure $P_{SB}$ is input to the hydraulic oil chamber 14a.

From this state, the linear solenoid valve SL4 is driven and controlled by the control unit, and when the control pressure $P_{SL4}$ is output from the output port SL4b, the control pressure $P_{SL4}$ is supplied via the oil paths c1, l1, m1, m2, m3, and m4 to the hydraulic servo 31 as the engagement pressure $P_{C3}$ of the third clutch C-3 while the pulsation is reduced by the damper 22.

Subsequently, when the engagement control of the third clutch C-3 due to the control pressure $P_{SL4}$ of the linear solenoid valve SL4 has completed, the solenoid valve SR is turned OFF by the control unit. Thereby, the C3 relay valve 12 is moved to the right-half position because the reverse travel range pressure $P_R$ is input to the hydraulic oil chamber 12b via the oil path b2, the reverse travel range pressure $P_R$ from the B2 relay valve 14 is input to the input port 12e via the oil paths i1, i2, and i4, and then supplied to the hydraulic servo 31 of the third clutch C-3 from the output port 12d via the oil paths m1, m2, m3, and m4. Thus, the third clutch C-3 is maintained in an engaged state by the subsequent reverse travel range pressure $P_R$.

In addition, the forward travel range pressure $P_R$ from the manual valve 15 is output from the output port 14e via the oil paths b1, b2, b3, and b4 and input port 14d of the B2 relay valve 14, and the reverse travel range pressure $P_R$ is supplied to the oil path i1. Accordingly, the reverse travel range pressure $P_R$ is supplied to the B-2 inner oil chamber 32b via the oil path i2, the check valve 21, and the oil paths j1 and j2, and to the B-2 outer oil chamber 32a via the oil path i3, the check ball valve 43, and the oil path i5, and the second brake B-2 is thereby engaged.

Subsequently, when, for example, the driver carries out an operation to select the N range by using the shift lever and the control unit identifies a neutral state, the solenoid valve SR is turned ON by an electronic command of the control unit, the B2 relay valve 14 is switched to the left-half position. At the same time, the linear solenoid valve SL4 is turned OFF, the hydraulic pressure of the hydraulic servo 31 of the third clutch C-3 is drained by the discharge port SL4d of the linear solenoid valve SL4 via the oil paths m4, m3, m2, m1, l1, and c1, and the clutch C-3 is thereby disengaged.

In addition, the solenoid valve SB remains turned OFF due to an electronic command of the control unit, and the B2 relay valve 14 is maintained in the left-half position. Therefore, the hydraulic pressure of the B-2 outer oil chamber 32a and the B-2 inner oil chamber 32b flows through the output port 14e and the input port 14d of the B2 relay valve 14 via the oil paths j4, j3, j2, and j1, is then discharged from the check ball valve 25 via the oil paths b4, b3, b1, and the output port 15d of the manual valve 15, and, the second brake B-2 is thereby disengaged.

However, in the reverse speed, for example, when the linear solenoid valve SL4 has failed and the control pressure $P_{SL4}$ is not output, the control unit determines that the third clutch C-3 is not engaged based, for example, on any one of an input shaft rotation speed change, an output shaft rotation speed change, and the vehicle speed and the like. Then, the control unit turns the solenoid valve SR OFF as failure control. Note that this condition is the same condition as when all of the solenoid valves fail (hereinafter referred to as "during an all-solenoids-OFF failure"), in which, for example, all solenoid valves are not energized due to a short or broken wire. In addition, as described above, the reverse travel range pressure $P_R$ is supplied to the B-2 outer oil chamber 32a and the B-2 inner oil chamber 32b of the second brake B-2, and the second brake B-2 is engaged.

When the solenoid valve SR is turned OFF, the C3 relay valve 12 is moved to the right-half position because the reverse travel range pressure $P_R$ is input to the hydraulic oil chamber 12b via the oil path b2. Thereby, the reverse travel range pressure $P_R$ from the B2 relay valve 14 is input to the input port 12e via the oil paths i1, i2, and i4, and is supplied to the hydraulic servo 31 of the third clutch C-3 from the output port 12d via the oil paths m1, m2, m3, and m4. Thus, although a linearly regulated control pressure is not input, the third clutch C-3 is engaged by the reverse travel range pressure $P_R$. That is, for example, even when all of the linear solenoid valves SL4 fail (during the all-solenoids-OFF failure), the reverse speed is established, and a minimum limp home is ensured.

Note that, in the hydraulic control apparatus 10 that has been described above, an explanation was provided in which the C3B2 relay valve 11 is switched by the signal pressure $P_{SR}$ of the solenoid valve SR, but a structure is also possible in which the C3B2 relay valve 11 is switched to the right-half position by the forward travel range pressure $P_D$ or the left-half position by the reverse travel range pressure $P_R$. Of course, a structure is also possible in which the C3B2 relay valve 11 is switched by both the forward travel range pressure $P_D$ and the reverse travel range pressure $P_R$.

According to the hydraulic control apparatus 10 for an automatic transmission according to the invention as has been explained above, because the C3B2 relay valve 11 is provided that supplies the control pressure $P_{SL4}$ of one linear solenoid valve SL4 to the hydraulic servo 32 of the second brake B-2 and the hydraulic servo 31 of the third clutch C-3 by switching therebetween, it is possible to enable the control of the engagement and disengagement of the second brake B-2 and the control of the engagement and disengagement of the third clutch C-3 using one linear solenoid valve SL4, and it is possible to reduce the number of linear solenoid valves, thereby reducing costs and size.

In addition, because the second brake B-2 is subject to engagement and disengagement control during forward travel, and the third clutch C-3 is subject to engagement and disengagement control during reverse travel, it is possible to control the engagement and disengagement of the second brake B-2 and the engagement and disengagement of the third clutch C-3 by using one linear solenoid valve SL4.

In addition, because the second brake B-2 is a brake that is engaged in order to establish the first forward speed during reverse drive in which the one way clutch F-1 idles, the frequency of use of the one linear solenoid valve SL4 described above is low in comparison to other pressure regulating solenoid valves, and thus it is possible to ensure sufficient durability even when used in the control of the engagement and disengagement of the third clutch C-3 during reverse travel.

Furthermore, because the third clutch C-3 includes a clutch that is engaged only during reverse travel, the frequency of use of the one linear solenoid valve SL4 described above is low in comparison to other pressure regulating solenoid valves, and thus it is possible to ensure a sufficient durability even when used in the control of the engagement and disengagement of the second brake B-2 during forward travel.

In addition, because there is provided the C3B2 relay valve 11 to which the control pressure $P_{SL4}$ of the linear solenoid valve SL4 is input and which is switched between the right-half position where the control pressure $P_{SL4}$ is supplied to the hydraulic servo 32 of the second brake B-2 and the left-half position where the control pressure $P_{SL4}$ is supplied to the hydraulic servo 31 of the third clutch C-3, it is possible to supply the control pressure $P_{SL4}$ of the one linear solenoid valve SL4 to the hydraulic servo 32 of the second brake B-2 and to the hydraulic servo 31 of the third clutch C-3 by switching therebetween.

Furthermore, because the solenoid valve SR that can output a signal pressure $P_{SR}$ is provided and the C3B2 relay-valve 11 is switched based on the signal pressure $P_{SR}$ of the solenoid valve SR, by controlling the solenoid valve SR based on whether forward travel or the reverse travel is being carried out, it is possible to supply the control pressure $P_{SL4}$ of the one linear solenoid valve SL4 to the hydraulic servo 32 of the second brake B-2 and to the hydraulic servo 31 of the third clutch C-3 by switching therebetween.

In addition, the solenoid valve SR is controlled such that the signal pressure $P_{SR}$ is not output when not energized and the signal pressure $P_{SR}$ is output during reverse travel, and the C3B2 relay valve 11 is switched from the right-half position to the left-half position when the signal pressure $P_{SR}$ is input. Therefore, even when the solenoid valve SR cannot be driven due, for example, to an electrical failure, it is possible to engage the second brake B-2, thereby establishing engine braking in the first forward speed.

Furthermore, the C3 relay valve is interposed between the C3B2 relay valve and the hydraulic servo 31 of the third clutch C-3, and communicates the control pressure $P_{SL4}$ of the linear solenoid valve SL4 to the hydraulic servo 31 of the third clutch C-3 when the signal pressure $P_{SR}$ of the solenoid valve SR is input and communicates the reverse travel range pressure $P_R$ to the hydraulic servo 31 of the third clutch C-3 when the signal pressure $P_{SR}$ of the solenoid valve SR is not input and the reverse travel range pressure $P_R$ is input. Therefore, even if the control pressure $P_{SL4}$ cannot be output because of, for example, a failure of the linear solenoid valve SL4, it is possible to engage the third clutch C-3 by setting the solenoid valve SR so as not to output the signal pressure $P_{SR}$, and thereby supplying the reverse travel range pressure $P_R$ to the hydraulic servo 31 of the third clutch C-3. Thus, even when the linear solenoid valve SL4 has failed, it is possible to establish the reverse speed, and it is possible to ensure a limp home. Note that, in the present embodiment, an explanation was provided in which the establishment of the reverse speed is ensured by using the reverse travel range pressure $P_R$. However, a structure may be used in which the establishment of the forward speeds is ensured by using the forward travel range pressure $P_D$.

In addition, the solenoid valve SR is controlled such that the signal pressure $P_{SR}$ is not output when the signal pressure $P_{SR}$ is output depending on the operating input to the R range of the shift lever and the third clutch C-3 is not engaged. Therefore, during normal operation, it is possible to supply the control pressure $P_{SL4}$ of the linear solenoid valve SL4 to the hydraulic servo 31 of the third clutch C-3, and it is possible to engage the third clutch C-3 smoothly. When the linear solenoid valve SL4 has failed, the C3 relay valve is switched after identifying the failure based on the non-engagement of the third clutch C-3, thereby supplying the reverse travel range pressure $P_R$ to the hydraulic servo 31 of the third clutch C-3.

Note that the C3B2 relay valve 11 may be switched based on at least one of the forward travel range pressure $P_D$ and the reverse travel range pressure $P_R$. By this, it is possible to supply the control pressure $P_{SL4}$ of the one linear solenoid valve SL4 by, for example, switching between the hydraulic servo 32 of the second brake B-2 and the hydraulic servo 31 of the third clutch C-3, without using the signal pressure $P_{SR}$ of the solenoid valve SR, that is, it is also possible to reduce the number of solenoid valves SR.

In addition, the linear solenoid valve SL4 inputs a line pressure $P_L$ as an original pressure for the control pressure $P_{SL4}$. Accordingly, there is no need to provide a valve or the like, which switches the original pressure for the linear solenoid valve SL4 such that the forward travel range pressure $P_D$ serves as the original pressure when the control pressure $P_{SL4}$ is supplied to the hydraulic servo 32 of the second brake B-2, and the reverse travel range pressure $P_R$ serves as the original pressure when the control pressure $P_{SL4}$ is supplied to the hydraulic servo 31 of the third clutch C-3. Thus, it is possible to reduce cost and size.

In addition, by using the hydraulic control apparatus 10 for an automatic transmission as described above in the hybrid drive system 1, it is possible to provide the hybrid drive system 1 that enables the realization of cost reduction and downsizing.

Note that, in the present embodiment that has been explained above, the hydraulic control apparatus 10 for an automatic transmission was applied to the hybrid drive system 1. However, of course, the present invention can also be applied to an automatic transmission in which only an internal combustion engine is used as a drive source. In addition, an explanation was provided in which the automatic transmission establishes four forward speeds and one reverse speed, but this is not limiting. Any type of automatic transmission may be used as long as it is provided with friction engaging elements that engage during forward travel and friction engaging elements that engage during reverse travel.

In addition, in the present embodiment, an explanation was provided in which the second brake B-2 is used as the first friction engaging element and the third clutch C-3 is used as the second friction engaging element, but this is not limiting. Any type of friction engaging element may be used as long as it is a friction engaging element in which a first friction engaging element engages during forward travel and a second friction engaging element engages during reverse travel.

The hydraulic control apparatus for an automatic transmission and the hybrid drive system provided with the same according to the present invention can be used in an automatic transmission, a hybrid drive system, and the like that are mounted in a vehicle, truck, bus, agricultural machinery, and the like, and in particular, can be advantageously used in ones that require cost reduction and downsizing.

According to an exemplary aspect, because a switching device is provided that switches between the hydraulic servo of the first friction engaging element and the hydraulic servo of the second friction engaging element so as to supply the control pressure of one pressure regulating valve to each of the hydraulic servos, the engagement and disengagement control of the first friction engaging element and the engagement and disengagement control of the second friction engaging element by using one pressure regulating solenoid valve becomes possible. Thus, it is possible to reduce the number of pressure regulating solenoid valves, thereby enabling cost reduction and downsizing.

According to an exemplary aspect, because the first friction engaging element undergoes engagement and disengagement control during forward travel and the second friction engaging element undergoes engagement and disengagement control during reverse travel, the control of the engagement and disengagement of the first friction engaging element and the control of the engagement and disengagement of the second friction engaging element by using one pressure regulating solenoid valve becomes possible.

According to an exemplary aspect, because the first friction engaging element includes a brake that engages in order to establish a low shift speed during reverse drive, in which the one-way clutch idles, the frequency of use of the one pressure regulating solenoid valve described above is low in comparison to other pressure regulating solenoid valves. Therefore, it is possible to ensure sufficient durability even when used for the control of the engagement and disengagement of the second friction engaging element during reverse travel.

According to an exemplary aspect, because the second friction engaging element includes a clutch that engages only during reverse travel, the frequency of use of the one pressure regulating solenoid valve described above is low in comparison to other pressure regulating solenoid valves. Therefore, it is possible to ensure sufficient durability even when used for the control of the engagement and disengagement of the first friction engaging element during forward travel.

According to an exemplary aspect, because the switching device inputs the control pressure of one pressure regulating solenoid valve and includes a first switching valve that switches between a first position that supplies the control pressure to the hydraulic servo of the first friction engaging element, and a second position that supplies the control pressure to the hydraulic servo of the second friction engaging element, it is possible to supply the control pressure of one pressure regulating solenoid valve to the hydraulic servo of the first friction engaging element and the hydraulic servo of the second friction engaging element by switching therebetween.

According to an exemplary aspect, because the switching device includes a signal solenoid valve that can output a signal pressure, and the first switching valve switches between a first position and a second position based on the signal pressure of the signal solenoid valve, by controlling the solenoid valve based on whether forward travel or the reverse travel is being carried out, it is possible to supply the control pressure of one pressure regulating solenoid valve to the hydraulic servo of the first friction engaging element and the hydraulic servo of the second friction engaging element by switching therebetween.

According to an exemplary aspect, the signal solenoid valve is controlled such that a signal pressure is not output when it is not energized and a signal pressure is output during reverse travel, and the first switching valve switches from the first position to the second position when the signal pressure is input. Accordingly, even when, for example, the signal solenoid valve cannot be actuated due to an electrical failure, it is possible to engage the first friction engaging element, thereby establishing a shift speed.

According to an exemplary aspect, the second switching valve is interposed between the first switching valve and the hydraulic servo of the second friction engaging element, and when the signal pressure of the signal solenoid valve is input, communicates the control pressure of the one pressure regulating solenoid valve to the hydraulic servo of the second friction engaging element, and when the signal pressure of the signal solenoid valve is not input and the range pressure is input, communicates the range pressure to the hydraulic servo of the second friction engaging element. Accordingly, even when, for example, the pressure regulating solenoid valve has failed and the control pressure cannot be output, by setting the signal solenoid valve so as not to output the signal pressure, the range pressure is supplied to the hydraulic servo of the second friction engaging element, thereby engaging the second friction engaging element. Thus, even when the pressure regulating solenoid valve has failed, it is possible to establish a shift speed, and it is possible to ensure a limp home.

According to an exemplary aspect, the signal solenoid valve outputs a signal pressure according to the operating input of the shift position of a shift selecting device, and when the second friction engaging element is not engaged, the signal solenoid valve is controlled such that the signal pressure is not output. Accordingly, during normal operation, the control pressure of the pressure regulating solenoid valve is supplied to the hydraulic servo of the second friction engaging element, and it is possible to engage the second friction engaging element smoothly. When the pressure regulating solenoid valve has failed, the second switching valve is switched by determining that there is a failure based on the non-engagement of the second friction engaging element (for example, the reverse speed not being established). Thus, it is possible to supply a reverse travel range pressure to the hydraulic servo of the second friction engaging element.

According to an exemplary aspect, because the first switching valve is switched to a first position or a second position based on at least one of the forward travel range pressure and the reverse travel range pressure, it is possible to supply the control pressure of the one pressure regulating solenoid valve to the hydraulic servo of the first friction engaging element and the hydraulic servo of the second friction engaging element by switching therebetween, without using, for example, the signal pressure of the signal solenoid valve. That is, it is possible to reduce the number of signal solenoid valves.

According to an exemplary aspect, one pressure regulating solenoid valve inputs the line pressure as an original pressure for the control pressure. Therefore, there is no need to provide a valve or the like that switches such that, for example, the forward travel range pressure serves as the original pressure when the control pressure is supplied to the hydraulic servo of the first friction engaging element, and the reverse travel range pressure serves as the original pressure when the control pressure is supplied to the hydraulic servo of the second friction engaging element. Thus, it is possible to achieve cost reductions and downsizing.

According to an exemplary aspect, it is possible to provide a hybrid drive system that enables the realization of cost reductions and downsizing.

What is claimed is:

1. A hydraulic control apparatus for an automatic transmission provided with a first friction engaging element and a second friction engaging element that are capable of supplying a control pressure that is regulated and controlled by one pressure regulating solenoid valve to each of a plurality of hydraulic servos, comprising:
   a switching device that switches between a hydraulic servo of the plurality of hydraulic servos of the first friction engaging element and a hydraulic servo of the plurality of hydraulic servos of the second friction engaging element so as to supply a control pressure from the one pressure regulating solenoid valve to each of the plurality of hydraulic servos, wherein:
      the switching enables a control of an engagement and disengagement of the first friction engaging element and the second friction engagement element using the one pressure regulating solenoid valve, and
      the switching device inputs the control pressure of the one pressure regulating solenoid valve, and comprises a first switching valve that switches between a first position that supplies the control pressure to the hydraulic servo of the first friction engaging element, and a second position that supplies the control pressure to the hydraulic servo of the second friction engaging element; and
   a range switching valve that is capable of setting an output state of at least one of a forward travel range pressure and a reverse travel range pressure according to an operating input to a shift selecting device that is operable to select a shift position, wherein:
      the first switching valve is switched to one of the first position and the second position based on at least one of the forward travel range pressure and the reverse travel range pressure.

2. The hydraulic control apparatus according to claim 1, wherein:
   the engagement and disengagement of the first friction engaging element is controlled during forward travel; and
   the engagement and disengagement of the second friction engaging element is controlled during reverse travel.

3. The hydraulic control apparatus according to claim 2, wherein:
   the automatic transmission is a multi-stage automatic transmission that is provided with a speed change gear mechanism that establishes a plurality shift speeds according to an engagement and disengagement of a plurality of the friction engaging elements, and includes a one-way clutch that restricts rotation of rotating elements of the speed change gear mechanism to one direction, and establishes a low shift speed during positive drive in which a drive rotation is transferred from an input shaft side to an output shaft side; and
   the first friction engaging element includes a brake that is engaged in order to establish a low shift speed during reverse drive in which the drive rotation is transferred from the output shaft side to the input shaft side.

4. The hydraulic control apparatus according to claim 3, wherein the second friction engaging element comprises a clutch that engages only during the reverse travel.

5. The hydraulic control apparatus according to claim 1, wherein:
   the switching device comprises a signal solenoid valve capable of outputting a signal pressure; and
   the first switching valve is switched to one of the first position and the second position based on the signal pressure of the signal solenoid valve.

6. The hydraulic control apparatus according to claim 5, wherein:
   the signal solenoid valve is controlled such that the signal pressure is not output when it is not energized and the signal pressure is output during reverse travel; and
   the first switching valve is switched from the first position to the second position when the signal pressure is input.

7. The hydraulic control apparatus according to claim 6, further comprising:
   a second switching valve that is interposed between the first switching valve and the hydraulic servo of the second friction engaging element, wherein:
   when the signal pressure of the signal solenoid valve is input to a first hydraulic oil chamber, the second switching valve is switched to a normal position at which the control pressure of the one pressure regulating solenoid valve is communicated to the hydraulic servo of the second friction engaging element and the range pressure to the hydraulic servo of the second friction engaging element is blocked, and
   when the signal pressure of the signal solenoid valve is not input and the range pressure is input to a second hydraulic oil chamber that acts against the first hydraulic oil chamber, the second switching valve is switched to a secure position at which the control pressure of the one pressure regulating solenoid valve is blocked and the range pressure is communicated to the hydraulic servo of the second friction engaging element.

8. The hydraulic control apparatus according to claim 7, wherein:
the signal solenoid valve outputs the signal pressure according to an operating input of the shift position of the shift selecting device, and when the second friction engaging element is not engaged, the signal solenoid valve is controlled such that the signal pressure is not output.

9. The hydraulic control apparatus according to claim 8, wherein the one pressure regulating solenoid valve inputs a line pressure that serves as an original pressure for the control pressure.

10. A hybrid drive system, comprising:
a hybrid drive unit that is structured such that drive power from an internal combustion engine is distributed to a first motor and a drive shaft by a power distribution mechanism, and at the same time, drive power of a second motor is applied to the drive shaft;
an automatic transmission that is capable of shifting a rotation of the drive shaft of the hybrid drive unit; and
the hydraulic control apparatus according to claim 9.

11. The hydraulic control apparatus according to claim 2, wherein the second friction engaging element comprises a clutch that engages only during the reverse travel.

12. The hydraulic control apparatus according to claim 1, wherein the one pressure regulating solenoid valve inputs a line pressure that serves as an original pressure for the control pressure.

13. A hybrid drive system, comprising:
a hybrid drive unit that is structured such that drive power from an internal combustion engine is distributed to a first motor and a drive shaft by a power distribution mechanism, and at the same time, drive power of a second motor is applied to the drive shaft;
an automatic transmission that is capable of shifting a rotation of the drive shaft of the hybrid drive unit; and
the hydraulic control apparatus according to claim 1.

14. A hydraulic control apparatus for an automatic transmission provided with a first friction engaging element and a second friction engaging element that are capable of supplying a control pressure that is regulated and controlled by one pressure regulating solenoid valve to each of a plurality of hydraulic servos, comprising:
a switching device that switches between a hydraulic servo of the plurality of hydraulic servos of the first friction engaging element and a hydraulic servo of the plurality of hydraulic servos of the second friction engaging element so as to supply a control pressure from the one pressure regulating solenoid valve to each of the plurality of hydraulic servos, wherein:
the switching enables a control of an engagement and disengagement of the first friction engaging element and the second friction engagement element using the one pressure regulating solenoid valve,
the engagement and disengagement of the first friction engaging element is controlled during forward travel,
the engagement and disengagement of the second friction engaging element is controlled during reverse travel,
the automatic transmission is a multi-stage automatic transmission that is provided with a speed change gear mechanism that establishes a plurality shift speeds according to an engagement and disengagement of a plurality of the friction engaging elements, and includes a one-way clutch that restricts rotation of rotating elements of the speed change gear mechanism to one direction, and establishes a low shift speed during positive drive in which a drive rotation is transferred from an input shaft side to an output shaft side, and
the first friction engaging element includes a brake that is engaged in order to establish a low shift speed during reverse drive in which the drive rotation is transferred from the output shaft side to the input shaft side.

15. A hydraulic control apparatus for an automatic transmission provided with a first friction engaging element and a second friction engaging element that are capable of supplying a control pressure that is regulated and controlled by one pressure regulating solenoid valve to each of a plurality of hydraulic servos, comprising:
a switching device that switches between a hydraulic servo of the plurality of hydraulic servos of the first friction engaging element and a hydraulic servo of the plurality of hydraulic servos of the second friction engaging element so as to supply a control pressure from the one pressure regulating solenoid valve to each of the plurality of hydraulic servos, wherein:
the switching enables a control of an engagement and disengagement of the first friction engaging element and the second friction engagement element using the one pressure regulating solenoid valve,
the engagement and disengagement of the first friction engaging element is controlled during forward travel,
the engagement and disengagement of the second friction engaging element is controlled during reverse travel, and
the second friction engaging element comprises a clutch that engages only during the reverse travel.

16. A hydraulic control apparatus for an automatic transmission provided with a first friction engaging element and a second friction engaging element that are capable of supplying a control pressure that is regulated and controlled by one pressure regulating solenoid valve to each of a plurality of hydraulic servos, comprising:
a switching device that switches between a hydraulic servo of the plurality of hydraulic servos of the first friction engaging element and a hydraulic servo of the plurality of hydraulic servos of the second friction engaging element so as to supply a control pressure from the one pressure regulating solenoid valve to each of the plurality of hydraulic servos, wherein:
the switching enables a control of an engagement and disengagement of the first friction engaging element and the second friction engagement element using the one pressure regulating solenoid valve, and
the one pressure regulating solenoid valve inputs a line pressure that serves as an original pressure for the control pressure.

* * * * *